F. A. CRANDELL & J. H. HEAVRIN.
STEERING DEVICE.
APPLICATION FILED FEB. 11, 1915.
1,197,347.
Patented Sept. 5, 1916.
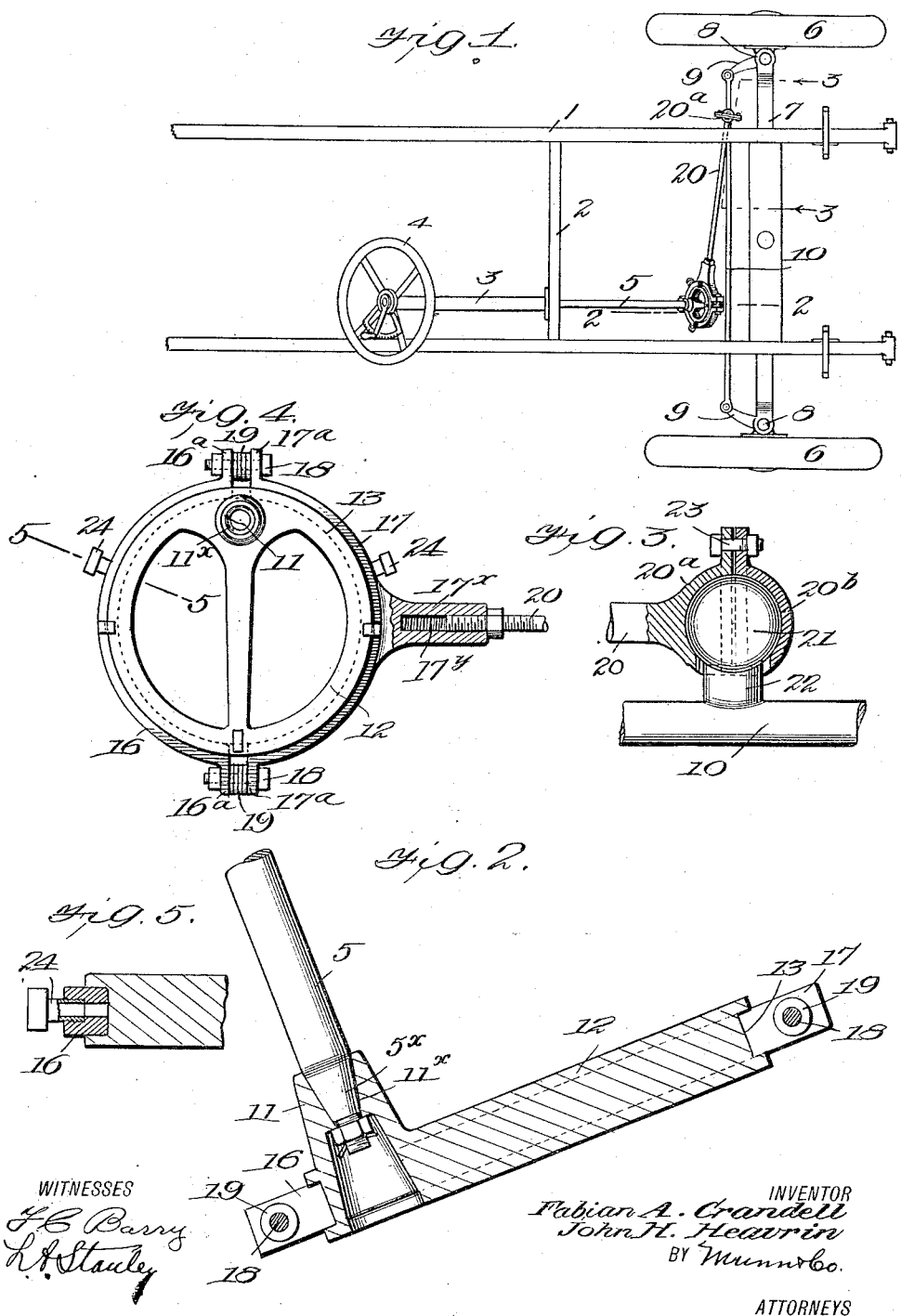
WITNESSES
F. C. Barry
L. A. Stanley
INVENTOR
Fabian A. Crandell
John H. Heavrin
BY Munn & Co.
ATTORNEYS

UNITED STATES PATENT OFFICE.

FABIAN A. CRANDELL AND JOHN H. HEAVRIN, OF BLOOMFIELD, NEBRASKA.

STEERING DEVICE.

1,197,347.  Specification of Letters Patent.  Patented Sept. 5, 1916.

Application filed February 11, 1915. Serial No. 7,562.

*To all whom it may concern:*

Be it known that we, FABIAN A. CRANDELL and JOHN H. HEAVRIN, citizens of the United States, and residents of Bloomfield, in the county of Knox and State of Nebraska, have made certain new and useful Improvements in Steering Devices, of which the following is a specification.

Our invention relates to improvements in steering devices for vehicles such as automobiles, and it consists in the combinations, constructions, and arrangements herein described and claimed.

An object of our invention is to provide a steering mechanism which is free from the jars ordinarily incident to devices of this kind, but which will positively actuate the wheels with a minimum of effort.

A further object of our invention is to provide a device of the type described which may be readily applied to certain makes of automobiles without necessitating any material change in the apparatus as now used.

A further object of our invention is to provide a device of the type described having few parts and which is therefore simple in construction and not liable to get out of order.

Other objects and advantages will appear in the following specification and the novel features of the device will be particularly pointed out in the appended claims.

Our invention is illustrated in the accompanying drawings forming part of this application in which—

Figure 1 is a plan view of the device, Fig. 2 is an enlarged section along the line 2—2 of Fig. 1, Fig. 3 is an enlarged section along the line 3—3 of Fig. 1, Fig. 4 is a face view of a portion of the device, and Fig. 5 is a section along the line 5—5 of Fig. 4.

Our invention, as stated above, is primarily designed for use with automobiles of a popular make, which are sold in large quantities and in which a frame 1 bears a dash board 2 to which is secured the steering post 3 bearing a steering wheel 4 and having a steering rod 5 connected with the wheel and extending forwardly and downwardly. The front wheels 6 are mounted on the axle 7 so as to turn on pivots 8, bell-crank arms 9 being connected by a common shift rod 10. The construction described so far is ordinary and forms no part of our invention except in so far as these parts coöperate with the mechanism about to be described, to form a novel steering combination.

The steering rod 5 is tapered, as shown at $5^x$ in Fig. 2, and is arranged to enter a tapered opening $11^x$ in a boss 11 on the ring or circular plate 12 which is provided with a peripheral groove 13, being held securely to said plate or ring by means of a nut 14 which may be locked in position by a cotter pin 15 or by a key or other similar device.

Surrounding the ring 12 is a circular yoke consisting of two semicircular halves 16 and 17 respectively. These halves are provided with flanges $16^a$ and $17^a$ having openings to receive bolts 18, shims 19 being provided for the purpose of adjusting the position of the members 16 and 17 with respect to the ring 12. One of the semicircular members, to wit; the member 17 is provided with an extension $17^x$ having a threaded bore $17^y$ arranged to receive a threaded end of a rod 20. The opposite end of the rod has a hemispherical socket $20^a$ which coöperates with a similar socket $20^b$ to hold the spherical end 21 of an arm 22 which is carried by the shift rod 10. A bolt 23 is provided for adjusting the position of the halves $20^a$ and $20^b$. The latter are recessed on the side next to the shift rod so as to permit play of the rod 20.

From the foregoing description of the various parts of the device the operation thereof may be readily understood. It will be seen that the steering rod 5 is disposed eccentrically of the circular yoke formed by the members 16 and 17 so that when the rod 5 is rotated, the rod 20 will be moved by the eccentric, thus moving the shift rod 10. The movement of the rod 20 will cause a slight rotation of the socket formed by the members $20^a$ and $20^b$ with respect to the ball 21.

The circular yoke is kept well lubricated by means of oil cups 24 such as that shown in Fig. 5.

The construction described forms a very efficient means of moving the front wheels in the operation of steering the device. The device may be operated without the usual jar or movement of the steering wheel occasioned by the obstructions in the road bed which tend to turn the wheels. On the other hand the operation of turning the wheels is very easily accomplished by the eccentric.

The device is simple in construction, and, as stated above, can be readily applied to machines of the type mentioned without the necessity of much change in the apparatus, since the main steering apparatus of the automobile is used in connection with our improvement.

We claim:

1. The combination with an automobile having a common shift rod for turning the front wheels, of a steering rod, a steering wheel secured at one end of said steering rod, a grooved ring or wheel rigidly secured to the other end of the steering rod, a circular yoke carried by said grooved wheel and rotatable with respect thereto, an arm connected with said yoke, a universal joint connecting said last named arm with said common shift rod, said yoke being disposed eccentrically with respect to the rotatable steering rod, and means for adjusting the position of said yoke toward and away from the center of said wheel or ring.

2. The combination with an automobile having a common shift rod for turning the front wheels, of a steering rod rotatable about its axis, a steering wheel secured at one end of said steering rod, a grooved ring or wheel rigidly secured to the other end of said steering rod and being mounted eccentrically with respect to the axis of the steering rod, a circular yoke carried in the groove of said grooved wheel and being rotatable with respect to the wheel, said yoke consisting of two semi-circular parts held in adjustable position with respect to the grooved wheel or ring, one of the parts being screw threaded, a threaded arm connected with said last-named part, and a universal joint connecting said arm with said common shift rod.

3. In a steering device for automobiles having a common shift rod and a universal joint connected with said common shift rod, a steering rod rotatable about its axis, a steering wheel secured to one end of said steering rod, a grooved ring or wheel rigidly secured to the other end of said steering rod and being mounted eccentrically with respect to the axis of the steering rod, a circular yoke carried in the groove of said grooved wheel, and being rotatable with respect to the wheel, said yoke consisting of two semi-circular parts held in adjustable position with respect to the grooved wheel or ring, one of the parts being screw threaded, and a threaded arm connected with said last-named part at one end and with said universal joint at the other.

FABIAN A. CRANDELL.
JOHN H. HEAVRIN.

Witnesses:
C. T. HECHT,
GEO. F. SOLL.

Copies of this patent may be obtained for five cents each, by addressing the "Commissioner of Patents, Washington, D. C."